United States Patent
Avanch et al.

(10) Patent No.: US 9,037,869 B2
(45) Date of Patent: May 19, 2015

(54) DELIVERING DATA FROM A SECURE EXECUTION ENVIRONMENT TO A DISPLAY CONTROLLER

(71) Applicants: Sasikanth Avanch, Bangalore (IN); Ninad Kothari, Hyattsville, MD (US); Rajesh Banginwar, Bangalore (IN); Taeho Kgil, Beaverton, OR (US)

(72) Inventors: Sasikanth Avanch, Bangalore (IN); Ninad Kothari, Hyattsville, MD (US); Rajesh Banginwar, Bangalore (IN); Taeho Kgil, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 13/666,922

(22) Filed: Nov. 1, 2012

(65) Prior Publication Data

US 2013/0111219 A1 May 2, 2013

(30) Foreign Application Priority Data

Nov. 2, 2011 (IN) .......................... 3119/DEL/2011

(51) Int. Cl.
*G06F 11/30* (2006.01)
*G06F 21/00* (2013.01)
*G06F 21/84* (2013.01)
*H04L 29/06* (2006.01)

(52) U.S. Cl.
CPC ............ *G06F 21/00* (2013.01); *H04L 63/0263* (2013.01); *H04L 63/1408* (2013.01); *G06F 21/84* (2013.01)

(58) Field of Classification Search
CPC .. G06F 21/00; H04L 63/0263; H04L 63/1408
See application file for complete search history.

(56) References Cited

U.S. PATENT DOCUMENTS

| | | | |
|---|---|---|---|
| 2003/0217150 A1* | 11/2003 | Roese et al. | 709/225 |
| 2003/0225893 A1* | 12/2003 | Roese et al. | 709/227 |
| 2006/0059574 A1* | 3/2006 | Fayad et al. | 726/34 |
| 2006/0277408 A1* | 12/2006 | Bhat et al. | 713/173 |
| 2008/0005586 A1* | 1/2008 | Munguia | 713/189 |
| 2008/0022355 A1* | 1/2008 | Khosravi et al. | 726/1 |
| 2008/0196088 A1* | 8/2008 | Vinokurov et al. | 726/5 |
| 2008/0320582 A1* | 12/2008 | Chen et al. | 726/12 |
| 2010/0306816 A1* | 12/2010 | McGrew et al. | 726/1 |
| 2011/0161650 A1* | 6/2011 | Paksoy et al. | 713/2 |
| 2011/0162082 A1* | 6/2011 | Paksoy et al. | 726/26 |

\* cited by examiner

*Primary Examiner* — Dede Zecher
*Assistant Examiner* — Trang Doan
(74) *Attorney, Agent, or Firm* — Jordan IP Law, LLC

(57) ABSTRACT

Methods and systems may include a computing system having a display, a display controller with a decryption module, and a security element with security logic. The security logic can be configured to establish a secure path between the secure element and the display in response to a secure output mode request, wherein the secure path includes the display controller. In addition, the security logic may be configured to prevent the decryption module from being bypassed, and transmit encrypted data from the secure element to the display via the secure path.

27 Claims, 4 Drawing Sheets

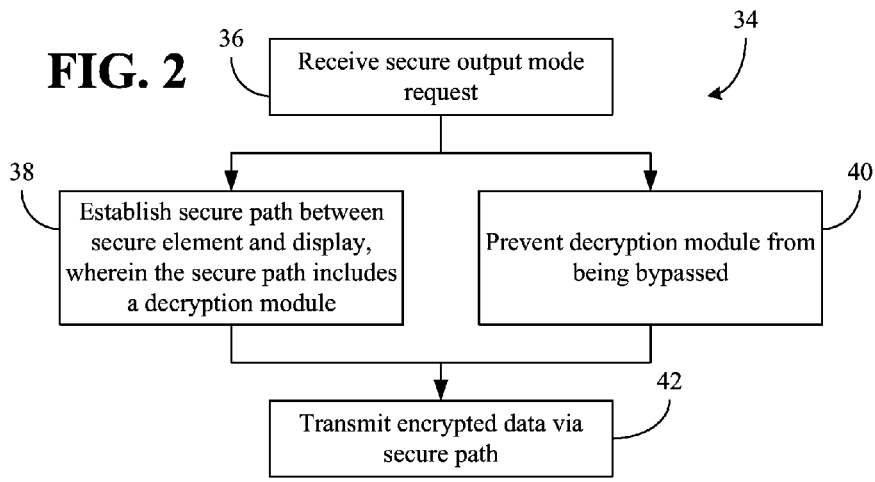
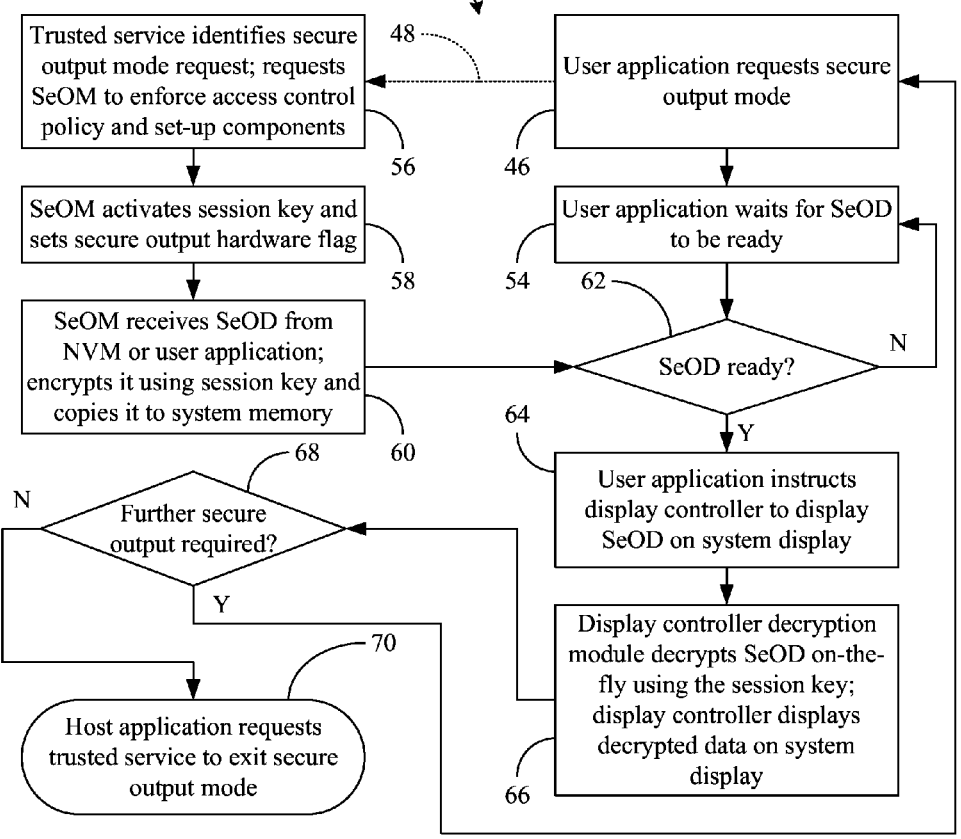

DELIVERING DATA FROM A SECURE EXECUTION ENVIRONMENT TO A DISPLAY CONTROLLER

BACKGROUND

1. Technical Field

Embodiments generally relate to the deployment of trusted services. More particularly, embodiments relate to displaying secure output data associated with trusted services.

2. Discussion

Services for mobile applications such as m-commerce (mobile commerce) may be relevant to the future growth of a wide variety of system-on-chip (SoC) platforms. While traditional applications can execute on the main applications processor in an un-trusted environment provided by the host operating system (OS), "trusted services" may execute within a trusted environment (i.e., outside the trust boundary of the host OS on the applications processor) provided by a secure element. Information that is displayed to the user in accordance with the trusted services, however, may still traverse the un-trusted host OS stack. Accordingly, such display information may be vulnerable to "snooping" as well as modification by malware executing on the host.

BRIEF DESCRIPTION OF THE DRAWINGS

The various advantages of the embodiments of the present invention will become apparent to one skilled in the art by reading the following specification and appended claims, and by referencing the following drawings, in which:

FIG. 2 is a flowchart of an example of a method of displaying secure output data according to an embodiment;

FIG. 3 is a flowchart of an example of a more detailed method of displaying secure output data according to an embodiment;

DETAILED DESCRIPTION

Embodiments may involve a computer implemented method in which a secure path is established between a secure element and a display in response to a secure output mode request, wherein the secure path includes a display controller. The method can also provide for preventing a decryption module of the display controller from being bypassed, and transmitting encrypted data from the secure element to the display via the secure path.

Embodiments may also include a system having a display, a display controller with a decryption module, and a secure element. The secure element can include security logic to establish a secure path between the secure element and the display in response to a secure output mode request, wherein the secure path is to include the display controller. In addition, the security logic may prevent the decryption module from being bypassed, and transmit encrypted data from the secure element to the display via the secure path.

Other embodiments can include a non-transitory computer readable storage medium having a set of instructions, which, if executed by a processor, cause a computer to establish a secure path between a secure element and a display in response to a secure output mode request. In one example, the secure path is configured to include a display controller. In addition, the instructions may cause a computer to prevent a decryption module of the display controller from being bypassed, and transmit encrypted data from the secure element to the display via the secure path.

Figure 1:
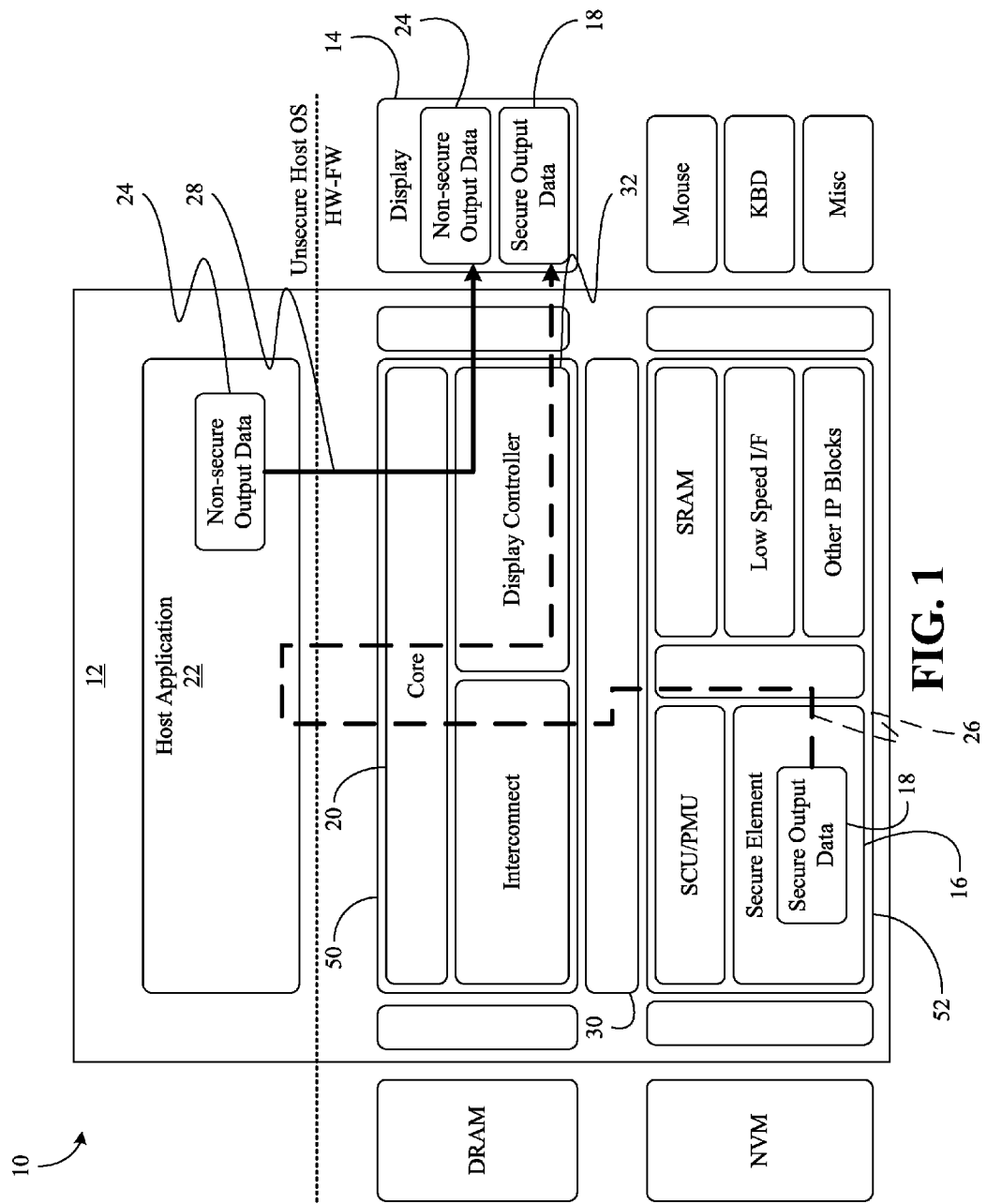
FIG. 1 is a block diagram of an example of a platform having a secure path for output data associated with a trusted service according to an embodiment.

Turning now to FIG. 1, a platform 10 is shown. The platform 10 could be part of a laptop, mobile Internet device (MID), personal digital assistant (PDA), media player, imaging device, etc., any smart device such as a smart phone, smart television (TV), smart tablet and so forth, or any combination thereof. Accordingly, the platform 10 may include a system-on-chip (SoC) subsystem 12 having a HW-FW (hardware-firmware) domain with a north complex component 50 coupled to a south complex component 52 via an interconnect bridge 30. In one example, the north complex component 50 is coupled to a display 14 such as a touch screen, LCD (liquid crystal display), LED (light emitting diode) device, CRT (cathode ray tube) monitor, etc.

The illustrated south complex component 52 includes a secure element 16 that generates secure output data ("SeOD") 18 in conjunction with the operation of a trusted service executing on the secure element 16. For example, the secure output data 18 might be associated with a banking application that displays transaction information on the display 14 for a user of the platform 10 to verify and certify the authenticity of an m-commerce transaction. By contrast, a core 20 of the illustrated north complex component 50 executes a host application 22 in an unsecure host operating system (OS) domain, wherein the host application 22 can generate non-secure output data 24 for the display 14.

In the illustrated example, a secure output path 26 is established between the secure element 16 and the display 14 for the secure output data 18, whereas the non-secure output data 24 is transmitted to the display 14 via a default output path 28. As will be discussed in greater detail, the secure output path 26 may include a display controller 32 that decrypts the secure output data 18, which can be encrypted by the secure element 16 prior to transmission. Moreover, the secure element 16 can prevent the decryption functionality of the display controller 32 from being bypassed so that malware cannot render the trusted service untrustworthy.

FIG. 2 shows a method 34 of displaying data. The method 34 may be implemented in fixed-functionality hardware using circuit technology such as application specific integrated circuit (ASIC), complementary metal oxide semiconductor (CMOS) or transistor-transistor logic (TTL) technology, as a set of firmware logic instructions stored in a machine- or computer-readable storage medium of a memory such as random access memory (RAM), read only memory (ROM), programmable ROM (PROM), flash memory, etc., or any combination thereof. Illustrated processing block 36 provides for receiving a secure output mode request. The secure output mode request could be received, for example, from a software application via a trusted service API (application programming interface), wherein the requesting application may reside either on-platform or off-platform.

A secure path may be established between a secure element and a display at block 38 in response to the secure output mode request. In one example, the secure path includes a display controller having a decryption module, wherein illustrated block 40 prevents the decryption module of the display controller from being bypassed by data destined for the display. Encrypted data may be transmitted from the secure element to the display via the secure path at block 42.

FIG. 3 demonstrates one approach to establishing a secure path, preventing a decryption module from being bypassed, and transmitting encrypted data via the secure path in greater detail. In particular, in a method 44, a user application may request a secure output mode at block 46. For example a request 48 might be made via an API corresponding to a trusted service executing on a secure element having a secure output manager ("SeOM"). Once the request 48 is made, the user application may wait for secure output data to be ready at block 54. Meanwhile, the trusted service may identify the request at block 56, and submit a request to the secure output manager of the secure element to enforce an access control policy and to set up security related components.

In response to the request from the trusted service, the secure output manager may activate a session key and set a secure output hardware flag at block 58. As will be discussed in greater detail, the session key can be used to encrypt the secure output data and the hardware flag may be used to prevent a decryption module of a display controller from being bypassed by data destined for the display. In one example, the secure output manager writes the session key directly to the display controller and directly sets the hardware flag in the display controller. Alternatively, the secure output manager could use an intermediate component such as a system controller unit (SCU) to activate the session key and set the hardware flag. Upon receiving secure output data from a data source such as, for example, NVM (non-volatile memory), a user application, etc., the secure output manager can encrypt it using the session key and copy the encrypted secure output data to system memory (e.g., dynamic RAM/DRAM, static RAM/SRAM, Scratch Pad Memory) at block 60.

Illustrated block 62 determines whether the encrypted secure output data is ready (e.g., the copy to system memory is complete). If not, the user application continues to wait at block 54. If the encrypted secure output data is ready, the user application may instruct the display controller to output the encrypted secure output data to the display at block 64. In response to the instruction from the user application, the display controller may decrypt the encrypted secure output data on-the-fly at block 66 using the session key, and output the decrypted data to the display. Thus, the encryption process protects the secure output data from unauthorized access in the example shown. Moreover, all data sent to the display is decrypted using a secret session key so that untrusted data (e.g., data from malware), will appear distorted on the display device, wherein the distortion can serve as an indicator to the user that the data is not authentic. If it is determined at block 68 that further secure output is not required, the host application requests that the trusted service exit the secure output mode at illustrated block 70.

Figure 4:
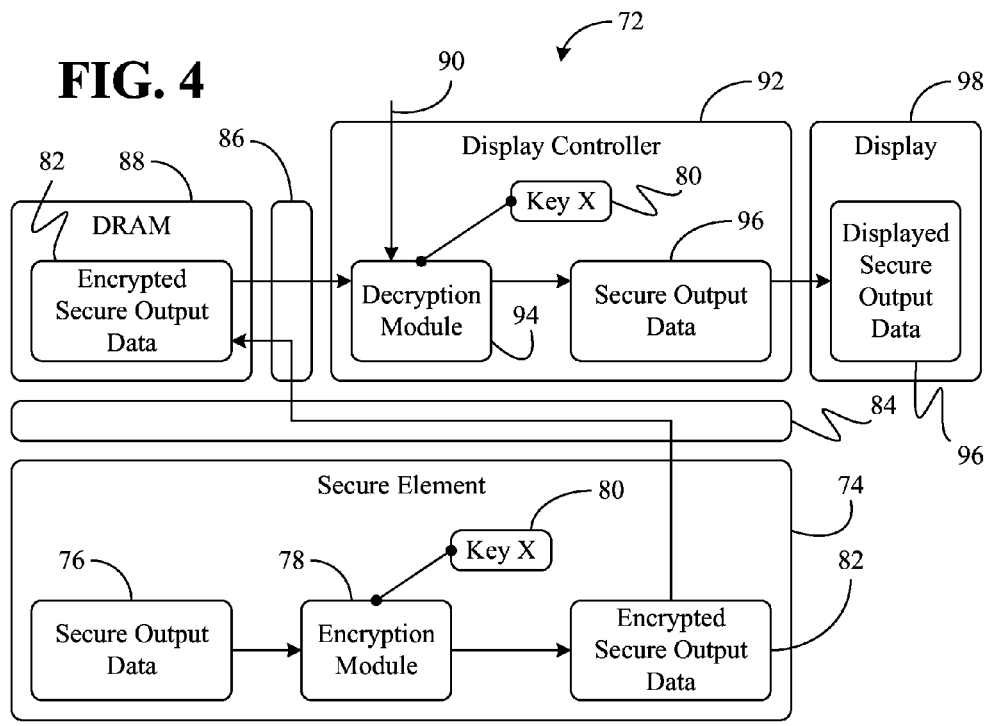
FIG. 4 is a block diagram of an example of a secure path implementation according to an embodiment.

Turning now to FIG. 4, a system 72 is shown in which a secure element 74 applies secure output data 76 to an encryption module 78, which uses a session key ("Key X") to transform the secure output data 76 into encrypted secure output data 82. The encrypted secure output data 82 may be stored, via an interconnect bridge 84 and memory bus 86, to a DRAM 88, wherein upon receiving one or more software application commands 90, a display controller 92 retrieves the encrypted secure output data 82 from the DRAM 88. The encrypted secure output data 82 can be applied to a decryption module 94, which may use the session key 80 to transform the encrypted secure output data 82 back into the secure output data 96. The illustrated secure output data 96 is then output to a display 98.

Figure 5:
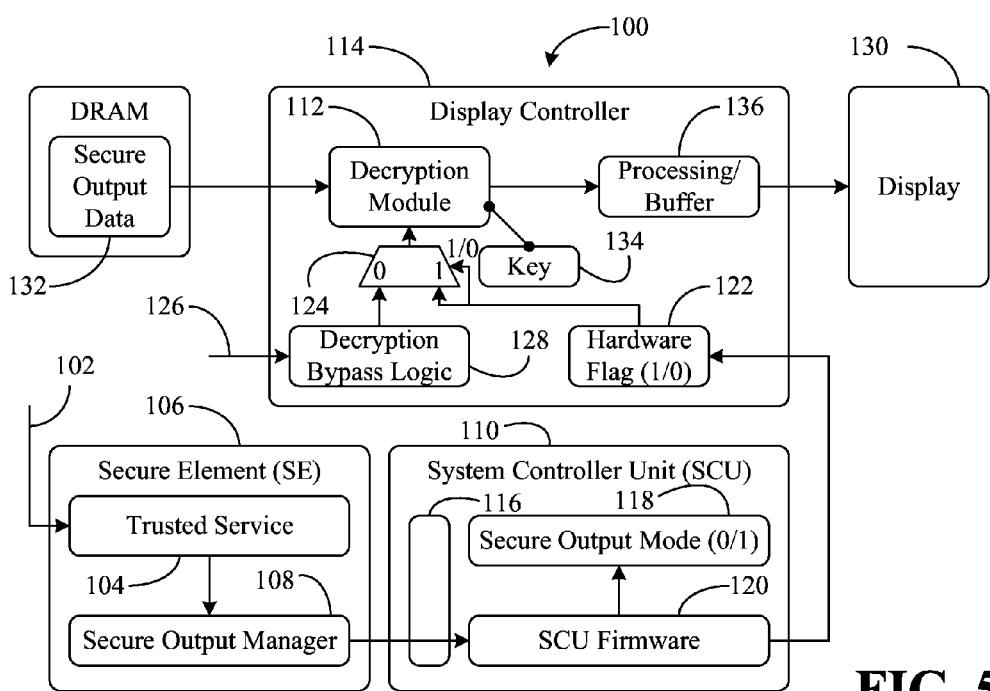
FIG. 5 is a block diagram of an example of a system in which a secure path is established and a decryption module in the secure path is prevented from being bypassed according to an embodiment.

FIG. 5 shows a system 100 in which a secure path is established for encrypted data and decryption of displayed data is ensured. In particular, in response to a secure output mode request 102, a trusted service 104 of a secure element 106 may issue a corresponding request to a secure output manager 108. In the illustrated example, a system controller unit (SCU) 110 is used to prevent bypassing of a decryption module 112 in a display controller 114 while the system 100 is in the secure output mode. In particular, the secure output manager 108 may use a system control (SC) fabric 116 to set a secure output mode flag 118 in the SCU 110, and cause SCU firmware (e.g., doorbell handler, interrupt service routine, etc.) 120 to set a hardware flag 122 in the display controller 114.

The illustrated hardware flag 122 is invisible to host applications and may be used to instruct decision logic such as a control multiplexer 124 to ignore a host application input 126 that would otherwise enable host applications to use decryption bypass logic 128 to bypass the decryption module 112. Instead, the control multiplexer 124 is instructed to force data destined for a display 130 to pass through the decryption module 112. Accordingly, secure output data 132 will be decrypted with a session key 134 and placed in a buffer 136 for output to the display 130 regardless of the actual source of the data 132 in the example shown.

The relevant functionality of the illustrated SCU 110 may alternatively be incorporated into another component of the system 100 such as, for example, the display controller 114. For example, the secure output manager 148 could write the session key directly into the register 172 and set the hardware flag 170 directly. Indeed, the SCU and the DRAM have been omitted from the secure path 26 (FIG. 1), discussed above, for simplicity and ease of discussion.

Figure 6:
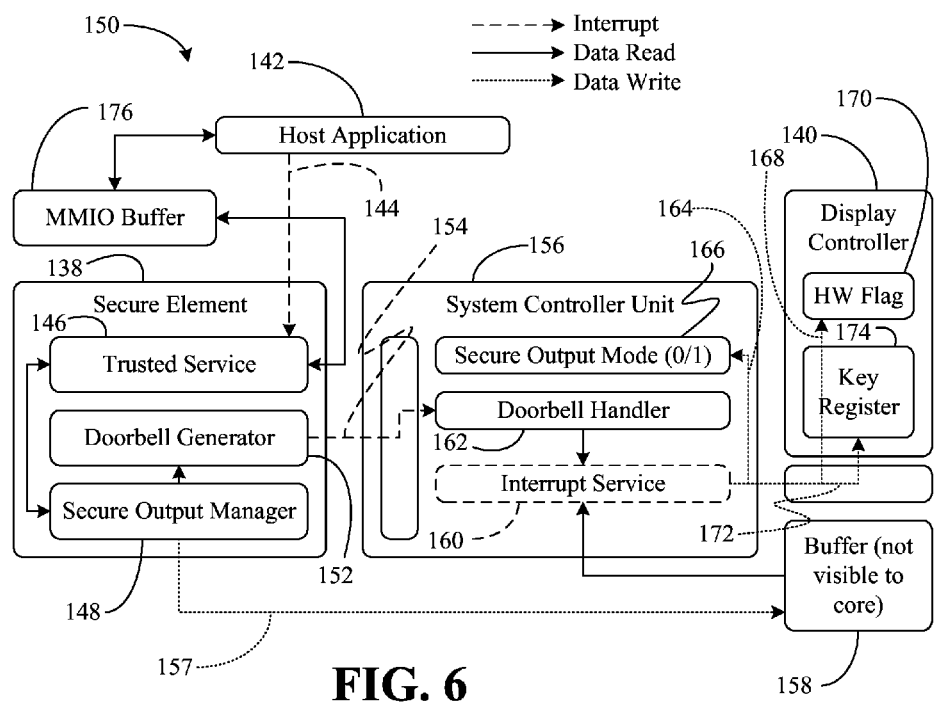
FIG. 6 is a block diagram of an example of a communications protocol according to an embodiment.

FIG. 6 shows an example of a communications protocol between a secure element 138 and a display controller 140 in greater detail. In the illustrated example, a host application 142 issues a request 144 for secure output service to a trusted service 146, which in turn issues a request to a secure output manager 148 to place a system 150 in a secure output mode. In response to the request from the trusted service 146, the secure output manager 148 may invoke a doorbell generator 152 in order to issue an interrupt 154 to a system controller unit 156. The illustrated secure output manager 148 also writes 157 a flag set command, a session key and a key program command to a hardware buffer 158, which is not visible to host applications running on the core (not shown).

The interrupt 154 may cause a doorbell handler 160 to call an interrupt service routine 162, wherein the illustrated interrupt service routine 162 uses the flag set command in the buffer 158 to conduct a set 164 of an internal secure output mode flag 166 as well as a set 168 of a hardware flag 170 in the display controller 140. As already noted, the hardware flag 170 may be invisible to host applications in order to ensure that malware is unable to bypass the decryption module (not shown) of the display controller 140. The interrupt service routine 162 may also use the key program command in the buffer 158 to conduct a write 172 of the session key to a key register 174 in the display controller 140. Secure output data may then be obtained from an MMIO (memory mapped input/output) buffer 176 for display via the secure path through the display controller 140.

Accordingly, the illustrated solutions may not require software to display a separate logo or image in order for a user to distinguish between trusted and untrusted content, because the sensitive content itself may appear distorted/garbled if it does not originate from a trusted source. In addition, specialized display hardware having a dedicated processing unit for decryption and verification can be avoided by using a secure element to control decision logic in the display controller.

Techniques described herein therefore enable SoC platforms to enforce dynamic access control of decryption logic, which can ensure that while in secure output mode, no applications in the host OS or the host OS kernel can bypass the decryption logic and send unauthorized data to a platform display. In addition, techniques can leverage existing SoC platform components to establish a secure path between a secure element and a display controller. Moreover, these techniques may be agnostic to both the host OS stack as well as the user.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
establishing a secure path between a secure element and a display in response to a secure output mode request, wherein the secure path includes a display controller;
preventing a decryption module of the display controller from being bypassed; and
transmitting encrypted data from the secure element to the display via the secure path;
wherein establishing the secure path includes:
writing a key to a hardware buffer, wherein the hardware buffer is invisible to one or more host applications;
writing a key program command to the hardware buffer, wherein the key program command includes an instruction to program the key into a hardware register of the display controller; and
issuing an interrupt.

2. The method of claim 1, wherein preventing the decryption module from being bypassed includes setting a hardware flag in the display controller in response to the secure output mode request, wherein the hardware flag is inaccessible to one or more host applications.

3. The method of claim 2, wherein the hardware flag instructs decision logic of the display controller to ignore a host application input and force data destined for the display to pass through the decryption module.

4. The method of claim 2, wherein setting the hardware flag includes:
writing a flag set command to a hardware buffer, wherein the hardware buffer is inaccessible to one or more host applications; and
issuing an interrupt.

5. The method of claim 4, wherein issuing the interrupt includes invoking a doorbell generator that issues the interrupt to a system controller unit.

6. The method of claim 1, wherein issuing the interrupt includes invoking a doorbell generator that issues the interrupt to a system controller unit.

7. The method of claim 1, wherein establishing the secure path includes writing a key directly from the secure element to the display controller, wherein preventing the decryption module from being bypassed includes directly setting a hardware flag in the display controller in response to the secure output mode request, and wherein the hardware flag is inaccessible to one or more host applications.

8. The method of claim 1, wherein transmitting the encrypted data from the secure element to the display includes:
using a key to convert output data to the encrypted data;
writing the encrypted data to a memory store; and
instructing a host application to transfer the encrypted data from the memory store to the display via the display controller.

9. The method of claim 1, further including receiving the secure output mode request via a trusted service application programming interface.

10. A system comprising:
a display;
a display controller including a decryption module;
a secure element including security logic to, establish a secure path between the secure element and the display in response to a secure output mode request, wherein the secure path is to include the display controller, prevent the decryption module from being bypassed, and transmit encrypted data from the secure element to the display via the secure path; and a hardware buffer that is to be inaccessible to one or more host applications, wherein the display controller further includes a hardware register, and wherein the security logic is to, write a key to the hardware buffer, write a key program command to the hardware buffer, wherein the key program command is to include an instruction to program the key into the hardware register, and issue an interrupt.

11. The system of claim 10, wherein the display controller further includes a hardware flag that is to be inaccessible to one or more host applications, and wherein the security logic is to set the hardware flag in response to the secure output mode request.

12. The system of claim 11, wherein the display controller further includes a host application input and decision logic, and wherein the hardware flag is to instruct the decision logic to ignore the host application input and force data destined for the display to pass through the decryption module.

13. The system of claim 11, further including a hardware buffer that is to be inaccessible to one or more host applications, and wherein the security logic is to, write a flag set command to the hardware buffer, and issue an interrupt.

14. The system of claim 13, further including a system controller unit, wherein the security logic is to invoke a doorbell generator that issues the interrupt to the system control unit.

15. The system of claim 10, further including a system controller unit, wherein the security logic is to invoke a doorbell generator that issues the interrupt to the system control unit.

16. The system of claim 10, wherein the display controller further includes a hardware flag that is to be inaccessible to one or more host applications, wherein the security logic is to, write a key directly from the secure element to the display controller, and directly set the hardware flag.

17. The system of claim 10, further including a memory store, wherein the security logic is to, use a key to convert output data into the encrypted data write the encrypted data to the memory store, and instruct a host application to transfer the encrypted data from the memory store to the display via the display controller.

18. The system of claim 10, wherein the security logic is to receive the secure output mode request via a trusted service application programming interface.

19. A non-transitory computer readable storage medium comprising a set of instructions, which, if executed by a processor, cause a computer to:

establish a secure path between a secure element and a display in response to a secure output mode request, wherein the secure path is to include a display controller;

prevent a decryption module of the display controller from being bypassed; and transmit encrypted data from the secure element to the display via the secure path, wherein establishing the secure path includes:

writing a key to a hardware buffer, wherein the hardware buffer is to be inaccessible to one or more host applications;

writing a key program command to the hardware buffer, wherein the key program command is to include an instruction to program the key into a hardware register of the display controller; and writing an interrupt.

20. The medium of claim 19, wherein the instructions, if executed, cause a computer to set a hardware flag in the display controller in response to the secure output mode request, wherein the hardware flag is to be inaccessible to one or more host applications.

21. The medium of claim 20, wherein the hardware flag is to instruct decision logic of the display controller to ignore a host application input and force data destined for the display to pass through the decryption module.

22. The medium of claim 20, wherein the instructions, if executed, cause a computer to:

write a flag set command to a hardware buffer, wherein the hardware buffer is to be inaccessible to one or more host applications; and issue an interrupt.

23. The medium of claim 22, wherein the instructions, if executed, cause a computer to invoke a doorbell generator that issues the interrupt to a system controller unit.

24. The medium of claim 19, wherein the instructions, if executed, cause a computer to invoke a doorbell generator that issues the interrupt to a system controller unit.

25. The medium of claim 19, wherein the instructions, if executed, cause a computer to:

write a key directly from the secure element to the display controller; and directly set a hardware flag in the display controller, wherein the hardware flag is to be inaccessible to one or more host applications.

26. The medium of claim 19, wherein the instructions, if executed, cause a computer to:

use a key to convert output data into the encrypted data;

write the encrypted data to a memory store; and instruct a host application to transfer the encrypted data from the memory store to the display via the display controller.

27. The medium of claim 19, wherein the instructions, if executed, cause a computer to receive the secure output mode request via a trusted service application programming interface.

* * * * *

UNITED STATES PATENT AND TRADEMARK OFFICE
CERTIFICATE OF CORRECTION

PATENT NO.      : 9,037,869 B2  
APPLICATION NO. : 13/666922  
DATED           : May 19, 2015  
INVENTOR(S)     : Sasikanth Avancha et al.

Page 1 of 1

It is certified that error appears in the above-identified patent and that said Letters Patent is hereby corrected as shown below:

On the title page, in the Applicants item (71), in line 1, delete "Avanch" and insert -- Avancha --, therefor.

On the title page, in the Inventors item (72), in line 1, delete "Avanch" and insert -- Avancha --, therefor.

Signed and Sealed this  
Ninth Day of February, 2016

Michelle K. Lee  
*Director of the United States Patent and Trademark Office*